(12) United States Patent
Park et al.

(10) Patent No.: US 10,252,723 B2
(45) Date of Patent: Apr. 9, 2019

(54) SLIP FACTOR LEARNING METHOD OF DUAL CLUTCH TRANSMISSION

(71) Applicant: Hyundai Autron Co., Ltd., Seongnam-si (KR)

(72) Inventors: Seong Jin Park, Seongnam-si (KR); Woo Sik Yoon, Seongnam-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 665 days.

(21) Appl. No.: 14/958,663

(22) Filed: Dec. 3, 2015

(65) Prior Publication Data

US 2016/0159362 A1 Jun. 9, 2016

(30) Foreign Application Priority Data

Dec. 5, 2014 (KR) .......................... 10-2014-0173830

(51) Int. Cl.
*F16H 61/00* (2006.01)
*B60W 30/19* (2012.01)
(Continued)

(52) U.S. Cl.
CPC ............ *B60W 30/19* (2013.01); *B60W 10/02* (2013.01); *B60W 10/06* (2013.01); *B60W 10/113* (2013.01); *F16H 61/0437* (2013.01); *F16H 61/688* (2013.01); *F16H 63/46* (2013.01); *B60W 2510/0275* (2013.01); *B60W 2510/0291* (2013.01); *B60W 2510/0638* (2013.01); *B60W 2510/0657* (2013.01); *B60W 2510/1005* (2013.01); *B60W 2710/025* (2013.01); *B60W 2710/0666* (2013.01); *B60Y 2300/427* (2013.01); *F16H 2059/465* (2013.01);
(Continued)

(58) Field of Classification Search
CPC ............... F16H 61/688; F16H 61/0437; F16H 2061/0087; F16H 2059/465
See application file for complete search history.

(56) References Cited

U.S. PATENT DOCUMENTS

| 5,658,213 | A | 8/1997 | Sato et al. | |
|---|---|---|---|---|
| 7,228,216 | B2* | 6/2007 | Inoue | ...................... F16D 48/06 |
| | | | | 192/48.2 |
| 9,211,880 | B2* | 12/2015 | Mair | ..................... F16H 61/688 |

FOREIGN PATENT DOCUMENTS

| CN | 102574522 A | 7/2012 |
|---|---|---|
| CN | 103511614 A | 1/2014 |

(Continued)

*Primary Examiner* — Erin D Bishop
(74) *Attorney, Agent, or Firm* — Morgan, Lewis & Bockius LLP (57) ABSTRACT

A slip factor learning method of a dual clutch transmission (DCT) may include: determining, by a control unit, whether the DCT is up-shifted or down-shifted; comparing an engine speed to a shift start reference speed, and determining whether the engine speed enters an actual gear shifting period or actual gear shifting is completed, in response to the determined type of the gear shifting; comparing a magnitude of an engine torque to a magnitude of a clutch torque at a point of time that the engine speed enters the actual gear shifting period or the actual gear shifting is completed; and learning a slip factor at the point of time that the engine speed enters the actual gear shifting period or the actual gear shifting is completed, based on the magnitude comparison result between the engine torque and the clutch torque.

11 Claims, 8 Drawing Sheets

(51) Int. Cl.
  *B60W 10/02* (2006.01)
  *B60W 10/06* (2006.01)
  *F16H 63/46* (2006.01)
  *F16H 61/688* (2006.01)
  *F16H 61/04* (2006.01)
  *B60W 10/113* (2012.01)
  *F16H 59/46* (2006.01)

(52) U.S. Cl.
  CPC ............... *F16H 2061/0087* (2013.01); *F16H 2061/0459* (2013.01)

(56) References Cited

FOREIGN PATENT DOCUMENTS

| | | |
|---|---|---|
| CN | 103786714 A | 5/2014 |
| CN | 104105907 A | 10/2014 |
| EP | 1653108 A1 | 5/2006 |
| FR | 2914382 A2 | 10/2008 |
| JP | 2008-82529 A | 4/2008 |
| JP | 2012-197896 A | 10/2012 |
| KR | 10-2002-0053340 A | 7/2002 |
| KR | 10-2011-0011440 A | 2/2011 |
| KR | 101393762 B1 | 5/2014 |
| KR | 10-2014-0121947 A | 10/2014 |

\* cited by examiner

SLIP FACTOR LEARNING METHOD OF DUAL CLUTCH TRANSMISSION

CROSS-REFERENCES TO RELATED APPLICATIONS

The present application claims priority to Korean application number 10-2014-0173830, filed on Dec. 5, 2014, which is incorporated by reference in its entirety.

BACKGROUND OF THE INVENTION

The present invention relates to a slip factor learning method of a dual clutch transmission (DCT), and more particularly, to a slip factor learning method of a DCT, which is capable of controlling the DCT to perform gear shifting without a strange feeling, through a learning operation for a slip factor when torque transfer occurs between an off-going clutch and an on-going clutch in a gear shifting period of the DCT.

In general, a DCT includes two clutches unlike a conventional single-plate transmission system, and is connected to two input shafts and one output shaft. The input shaft is a rod-shaped shaft which transmits power to a position away therefrom through a rotary motion or linear reciprocating motion.

Furthermore, an engine is connected to the input shaft through a clutch, and the input shaft is connected to the output shaft through a gear and then transmits power to a wheel. The clutch used to couple or decouple shafts is a kind of shaft coupling device which temporarily disconnect or connect power of the engine, and is used when gear shifting is performed to change speed.

A general seven-speed DCT includes first and second input shafts and first and second clutches. The first input shaft is connected to odd-numbered gears (first, third, fifth, and seventh gears), and the first clutch connects a gear stage to the engine. The second input shaft is connected to a reverse gear and even-numbered gears (second, fourth, and sixth gears), and the second clutch connects a gear stage to the engine.

Thus, while the vehicle is operated in a state where the first clutch is connected to the output shaft through the first input shaft and an odd-numbered gear, gear shifting may be performed through a series of processes of applying even-numbered gear of the second input shaft, releasing the torque of the first clutch, and increasing the torque of the second clutch. At this time, the engaged (or coupled) clutch (for example, the second clutch) becomes an on-going clutch, and the other clutch (for example, the first clutch) of which the engagement is released (or disengaged) becomes an off-going clutch.

The DCT must accurately know the relation (TS curve) between clutch torque and stroke during clutch control, in order to reliably transmit an actually-inputted engine torque to a clutch. When a clutch torque equal to or more than a normal value is matched with a specific stroke on the TS curve, an excessive impact occurs. On the other hand, when a clutch torque less than the normal value is applied, the engine may be run up.

Furthermore, although the TS curve is accurately matched at the initial stage, the TS curve may be changed from actual situations, due to abrasion, thermal deformation, or mass-production deviation. Thus, the DCT learns the TS curve, in order to prevent an abnormality of the transmission system. However, although the DCT learns the TS curve, the friction characteristic or slip characteristic may be changed during a gear-shifting period in which a slip frequently occurs, which makes it difficult to perform gear shifting without a strange feeling. The slip may occur when coupling and releasing which are two frictional elements during gear shifting are not suitably controlled.

The related art of the present invention is disclosed in Korean Patent No. 10-1393762 published on May 2, 2014 and entitled "Method for estimating transmitted torque of dry-type clutch in vehicle").

BRIEF SUMMARY

Embodiments of the present invention are directed to a slip factor learning method of a DCT, which is capable of controlling the DCT to perform gear shifting without a strange feeling, through a learning operation for a slip factor when torque transfer occurs between an off-going clutch and an on-going clutch in a gear shifting period of the DCT.

In one embodiment, a slip factor learning method of a DCT may include: determining, by a control unit, whether the DCT is up-shifted or down-shifted; comparing, by the control unit, an engine speed to a shift start reference speed, and determining whether the engine speed enters an actual gear shifting period or actual gear shifting is completed, in response to the determined type of the gear shifting; comparing, by the control unit, a magnitude of an engine torque to a magnitude of a clutch torque at a point of time that the engine speed enters the actual gear shifting period or the actual gear shifting is completed; and learning, by the control unit, a slip factor at the point of time that the engine speed enters the actual gear shifting period or the actual gear shifting is completed, based on the magnitude comparison result between the engine torque and the clutch torque.

After the learning of the slip factor, the control unit may multiply the learned slip factor by a preset propagation coefficient, and propagate the multiplication result to a region which has a preset clutch temperature and a target slip amount, and the propagation coefficient may be applied to be inversely proportional to a distance between the center value of a target slip amount of a region where learning is actually performed and the center value of a target slip amount of a region to which learning is to be propagated.

When the DCT is up-shifted, the control unit may increase an on-going clutch torque at a preset slope during a preset reference time from a point of time that the on-going clutch torque becomes equal to the engine torque after torque transfer is completed, and the control unit may detect an on-going clutch torque when the engine speed enters the actual gear shifting period, determine that an actual on-going clutch torque is smaller than a currently-inputted engine torque, when the engine speed does not becomes lower than the shift start reference speed even though the on-going clutch torque is applied during more than the preset reference time, and learn to increase the slip factor, and when the engine speed becomes lower than current-gear synchronous speed before the torque transfer is completed, the control unit may determine that the on-going clutch torque is larger than the engine torque, and learn to reduce the slip factor.

The point of time that the torque transfer is completed may correspond to the point of time that the off-going clutch torque becomes zero.

The actual gear shifting period may include a period in which the engine speed is changed to the target gear speed from the current gear speed.

The shift start reference speed may correspond to (the current-gear synchronous speed—the target slip amount).

When the actual gear shifting is completed after the engine speed enters the actual gear shifting period, the control unit may release an engine torque reduction request at the point of time that the actual gear shifting is completed, and when the final engine speed becomes higher than a shift end reference speed after the engine torque reduction request is released, the control unit may determine that the actual on-going clutch torque is smaller than a target on-going clutch torque, and learn to increase the slip factor, and when the final engine speed becomes higher than the shift end reference speed and coincides with the target-gear synchronous speed, the control unit may determine that the actual on-going clutch torque is larger than the target on-going clutch torque, and learn to reduce the slip factor.

The shift end reference speed may correspond to (the target-gear synchronous speed+the target slip amount).

When the DCT is down-shifted and the engine speed becomes higher than a target-gear synchronous speed immediately before an on-going clutch torque is applied, the control unit may determine that an actual off-going clutch torque with respect to the engine torque is smaller than a target off-going clutch torque, and learn to increase the slip factor, and when the engine speed becomes lower than the target-gear synchronous speed immediately before the on-going clutch torque is applied, the control unit may determine that the actual off-going clutch torque with respect to the engine torque is larger than the target off-going clutch torque, and learn to reduce the slip factor.

The point of time that the torque transfer is completed may correspond to the point of time that the off-going clutch torque becomes zero.

When a slip amount becomes larger than a reference slip amount after the torque transfer of the DCT is completed, the control unit may determine that an actual on-going clutch torque is smaller than a target on-going clutch torque, and learn to increase the slip factor, and when the slip amount becomes smaller than the reference slip amount, the control unit may determine that the actual on-going clutch torque is larger than the target on-going clutch torque, and learn to reduce the slip factor.

In order to determine whether the slip amount becomes larger or smaller than the reference slip amount, the control unit may determine whether the engine speed is larger or smaller than (current-gear synchronous speed+target slip).

DETAILED DESCRIPTION

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
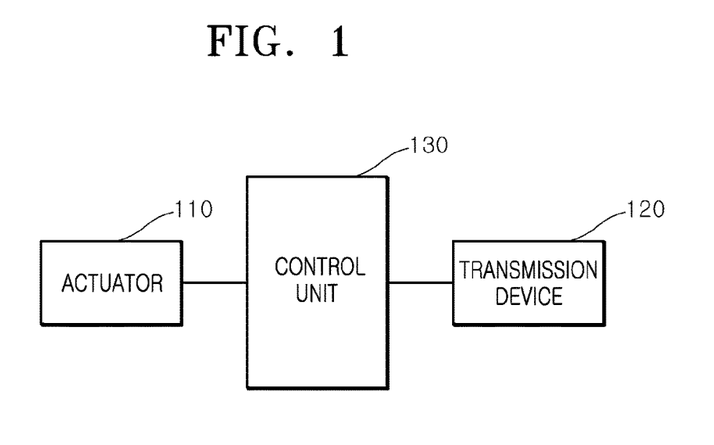
FIG. 1 is a diagram illustrating a schematic configuration of a conventional DCT control device.

As illustrated in FIG. 1, the units required for controlling the DCT include a clutch actuator 110 for controlling the clutches, a transmission device 120 for performing gear shifting by controlling a shift fork of the transmission, and a control unit 130 for controlling the transmission device 120 according to the vehicle speed and the opening degree of a throttle valve.

The transmission device 120 must have a pre-select function as well as a function of simply performing gear shifting. The pre-select function is to engage gear stages with the respective clutches at the same time, the gear stages belonging to the two transmission systems divided into the odd-numbered gears and the even-numbered gears, and to switch the coupled state and the released state of the two clutches, in order to perform gear shifting.

Furthermore, the transmission device 120 must have an active interlock function of maintaining a transmission lug of the same transmission system, which does not participate in gear shifting, in a neutral state such that two gear stages belonging to the same transmission system are not engaged at the same time. The transmission device 120 must be able to provide the above-described basic functions through simple configuration and structure, and secure stable and reliable operability as well as endurance.

In general, a wet transmission increases the position of a solenoid, and converts the position into a clutch torque. At this time, a solenoid current I and a pressure P applied to a clutch plate by hydraulic pressure formed by the solenoid, that is, a PI-curve characteristic may be determined. Thus, the wet transmission may calculate a target pressure to satisfy a target clutch torque, and then convert the target pressure into the PI curve. Then, a TCU (Transmission Control Unit) may control a target current to increase the clutch torque.

However, a dry transmission (for example, DCT) mainly uses a motor. The dry transmission increases the position of the motor and converts the position into a clutch torque. That is, when the position s of the motor is increased to push a clutch plate, a force F may be generated. Then, a torque t applied the clutch plate may be determined by multiplying the force F by a friction coefficient $\mu$. That is, a TS-curve characteristic may be determined. Thus, the dry transmission may calculate a target motor position to satisfy a target clutch torque, and convert the target motor position into the TS curve. Then, a TCU may control the target motor position to increase the clutch torque.

In general, a TS curve indicates the relation between motor position and transmitted torque in a micro slip region where the relative speed y between an engine and an input shaft (that is, slip amount) is zero or less than 30 rpm.

Figure 2:
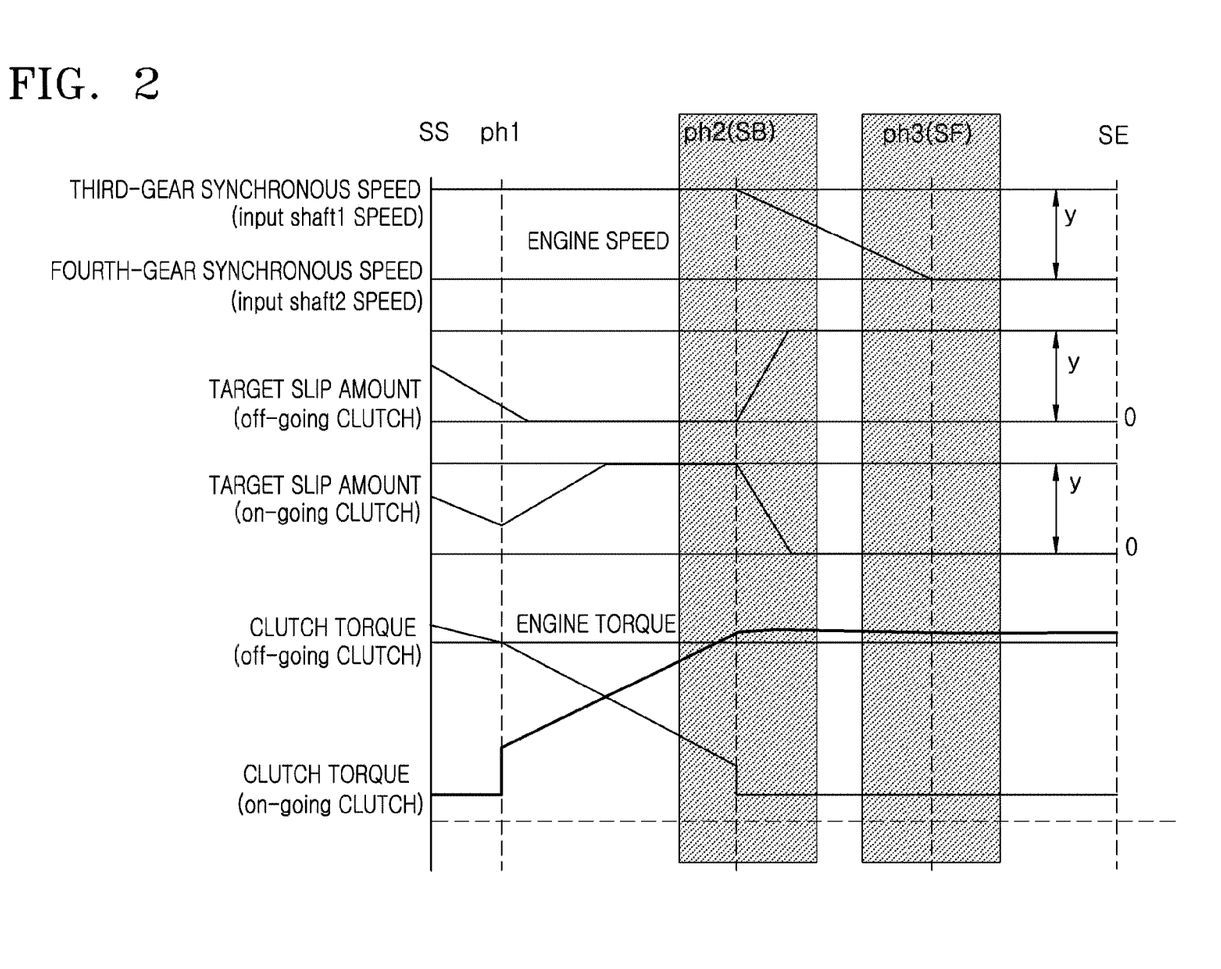
FIG. 2 is a diagram for describing the relation between target slip amount and clutch torque when the DCT is up-shifted in accordance with an embodiment of the present invention.

FIG. 2 is a diagram illustrating the relation between target slip amount and clutch torque, when a DCT is up-shifted in accordance with an embodiment of the present invention.

As illustrated in FIG. 2, when a torque equal to or more than an engine torque is applied to a first clutch in case where a third gear is engaged in the DCT, the engine speed may become equal to the third gear speed. That is, speed synchronization may be achieved. Then, when a torque equal to or more than the engine torque is applied to a second clutch in case where a fourth gear is engaged, the engine speed may become equal to the fourth gear speed. That is, speed synchronization may be achieved.

The third-gear synchronous speed may indicate an expected speed of the engine when the third gear is engaged and a torque equal to or more than the engine torque is applied to the first clutch, and the fourth-gear synchronous speed may indicate an expected speed of the engine when the fourth gear is engaged and a torque equal to or more than the engine torque is applied to the second clutch.

When the DCT is up-shifted from the third gear to the fourth gear, the control unit 130 may disengage the third gear and engage the fourth gear. Then, the control unit 130 may adjust the engine speed to the fourth-gear synchronous speed from the third-gear synchronous speed, while gradually reducing the torque of the first clutch (off-going clutch) and gradually increasing the torque of the second clutch (on-going clutch).

Referring to FIG. 2, the relation between target slip amount and clutch torque during the up-shift operation of the DCT will be described in more detail.

Referring to FIG. 2, the engine speed may be set to the third-gear synchronous speed at a step SS (Shift Start) in which preparation for gear shifting is started. Then, the engine speed may be adjusted to the fourth-gear synchronous speed from a step ph3 (Phase 3) in which the DCT is shifted to the four gear (actual gear shifting).

At this time, the relative speed (that is, slip amount) between the third gear and the fourth gear may be set to y. That is, when the speed of the input shaft of the current gear (third gear) and the speed of the input shaft of the target gear (fourth gear) are measured, the relative speed y therebetween may be set to the slip amount. The slip amount may be changed depending on the respective gears, and the slip amount between the third and fourth gears may be set to 1,000 rpm.

At this time, the control unit 130 may adjust the target slip amount of the off-going clutch (first clutch) to zero immediately before a step ph2 (Phase 2) in which gear shifting is started (that is, the control unit 130 may adjust the speed of the first clutch to the third synchronous speed in order to detect the speed of the engine which is being rotated at the third-gear synchronous speed). Then, the control unit 130 may gradually increase the target slip amount of the off-going clutch (first clutch) from the step ph2 in which the gear shifting is started (that is, the control unit 130 may gradually reduce the off-going clutch torque and gradually release the coupling between the off-going clutch and the engine). On the other hand, the control unit 130 may gradually reduce the target slip amount of the on-going clutch (second clutch) (that is, the control unit 130 may gradually increase the on-going clutch torque to engage the on-going clutch to the engine).

At this time, although not clearly illustrated in FIG. 2, the control unit 130 may reduce the engine torque in order to stably perform gear shifting, after the step ph2 in which the DTC is shifted from the third gear to the fourth gear (actual gear shifting). Referring to FIG. 2, the on-going clutch torque rises slightly over the engine torque after the step ph2 and then gradually falls.

In FIG. 2, the control patterns of the off-going clutch torque, the on-going clutch torque, and the engine torque at the respective steps SS, ph1, ph2, ph3, and SE correspond to control patterns during a general up-shift operation of the DCT. Thus, the detailed descriptions thereof are omitted herein.

In FIG. 2, the step ph2 indicates a step of completing torque transfer by releasing the torque of the first clutch (off-going clutch) and increasing the torque of the second clutch (on-going clutch), the step ph3 indicates a step of adjusting the engine speed to the fourth-gear synchronous speed after the torque transfer is completed, and a step SE (Shift End) indicates a step of checking whether the fourth gear synchronization is achieved after the step ph3 and ending the gear shifting.

Figure 3:
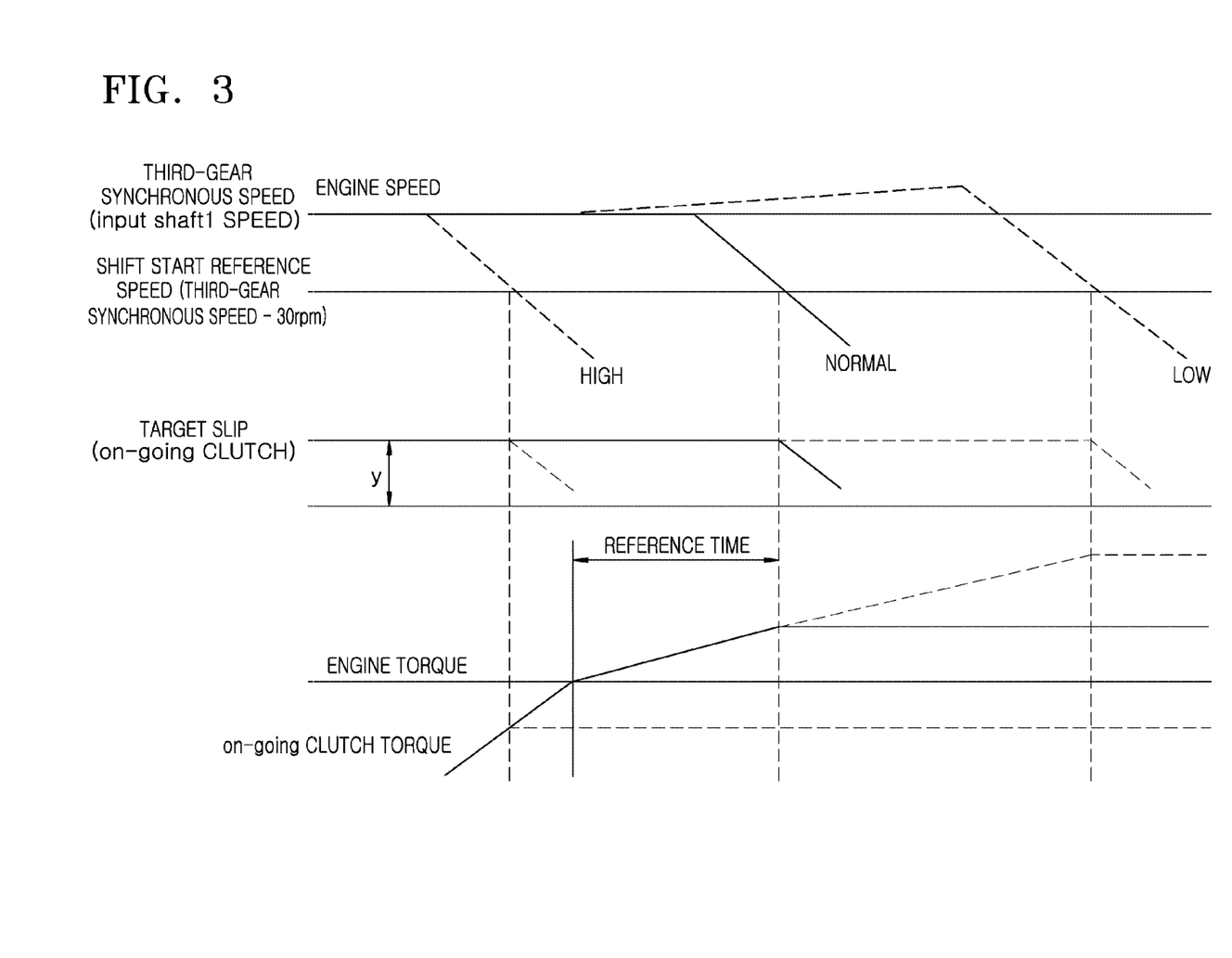
FIG. 3 is a diagram for describing the relation between target slip amount and clutch torque at a step ph2 (Phase 2) in FIG. 2.
Figure 4:
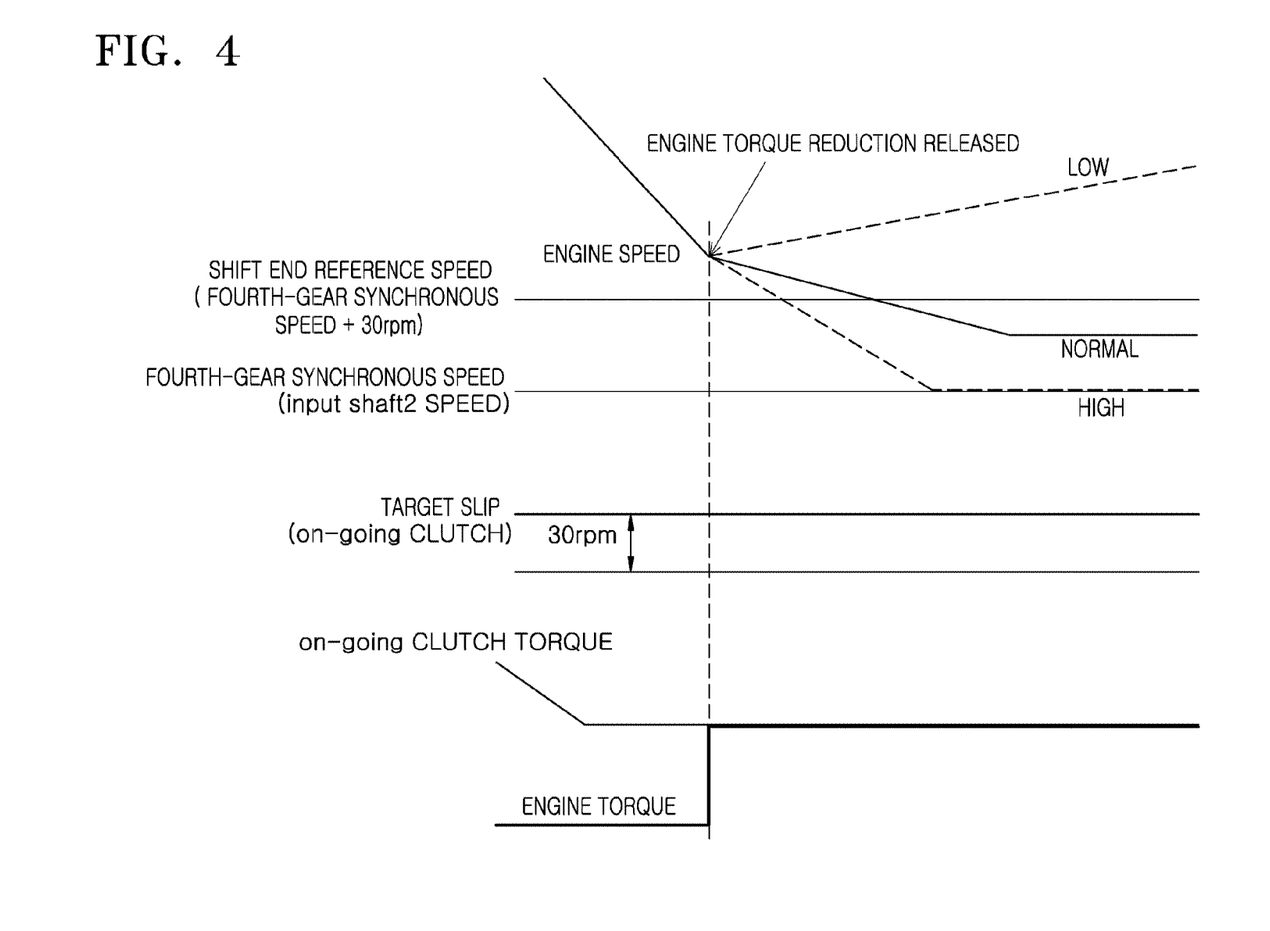
FIG. 4 is a diagram for describing the relation between target slip amount and clutch torque at a step ph3 (Phase 3) in FIG. 2.

FIG. 3 is a diagram for describing the relation between target slip amount and clutch torque at the step ph2 in FIG. 2, and FIG. 4 is a diagram for describing the relation between target slip amount and clutch torque at the step ph3 in FIG. 2.

Referring to FIG. 3, the control unit 130 may increase the on-going clutch torque at a preset slope during a preset reference time (for example, 100 ms) from the point of time that the on-going clutch torque becomes equal to the engine torque, after the torque transfer is completed (that is, after the off-going clutch torque becomes zero at the step ph2), in the case of the up-shift operation.

Then, the control unit 130 may detect the on-going clutch torque when the engine speed enters the actual gear shifting period (that is, at the reference time point at which actual gear shifting is performed and the third-gear synchronous speed is 30 rpm). The actual gear shifting period may indicate the period from the step ph2 to the step ph3, in which the engine speed is changed.

At this time, when a predefined actual shift period entry time (that is, preset reference time) elapses (that is, the engine speed is not reduced to the third-gear synchronous speed of 30 rpm), the engine speed is not reduced even though the on-going clutch torque is applied. Thus, the control unit 130 may determine that the actual on-going clutch torque is smaller than the currently-inputted engine torque, and control the DCT to learn to increase a slip factor or friction coefficient.

However, when the engine speed falls below the third-gear synchronous speed before the torque transfer is completed (that is, when the engine speed is lowered to the third-gear synchronous speed of 30 rpm before the on-going clutch torque becomes equal to the engine torque), the control unit 130 may determine that the actual on-going clutch torque is larger than the engine torque, and control the DCT to learn to reduce the slip factor or friction coefficient. At this time, the target slip amount of the on-going clutch may be set to a value corresponding to a speed difference y between the third and fourth gears (for example, 1,000 rpm), because the actual gear shifting is not yet completed.

Referring to FIG. 4, an engine torque reduction request may be released at the point of time that the actual gear shifting (that is, the change of the engine speed) is completed at the step ph3. When the final engine speed becomes higher than a shift end reference speed (fourth-gear synchronous speed+30 rpm) after the engine torque reduction request is released (that is, when the slip amount becomes larger than the target slip amount of 30 rpm, for example), the control unit 130 may determine that the actual on-going clutch torque is smaller than the target value (the target on-going clutch torque), and control the DCT to learn to increase the slip factor or friction coefficient. For example, when it is assumed that a reference slip factor is 1, the control unit 130 may learn to increase the reference slip factor to more than 1.

On the other hand, when the final engine speed becomes higher than the shift end reference speed (fourth synchronous speed+30 rpm) and coincides with the fourth-gear synchronous speed, the control unit 130 may determine that the actual on-going clutch torque is larger than the target value (the target on-going clutch torque), and control the DCT to learn to reduce the slip factor or friction coefficient. For example, when it is assumed that the reference slip factor is 1, the control unit 130 may learn to reduce the reference slip factor to less than 1.

At this time, the target slip amount of the on-going clutch may become about 30 rpm because the actual gear shifting (the change of the engine speed) is almost completed. However, the target slip amount is not limited to 30 rpm.

Figure 5:
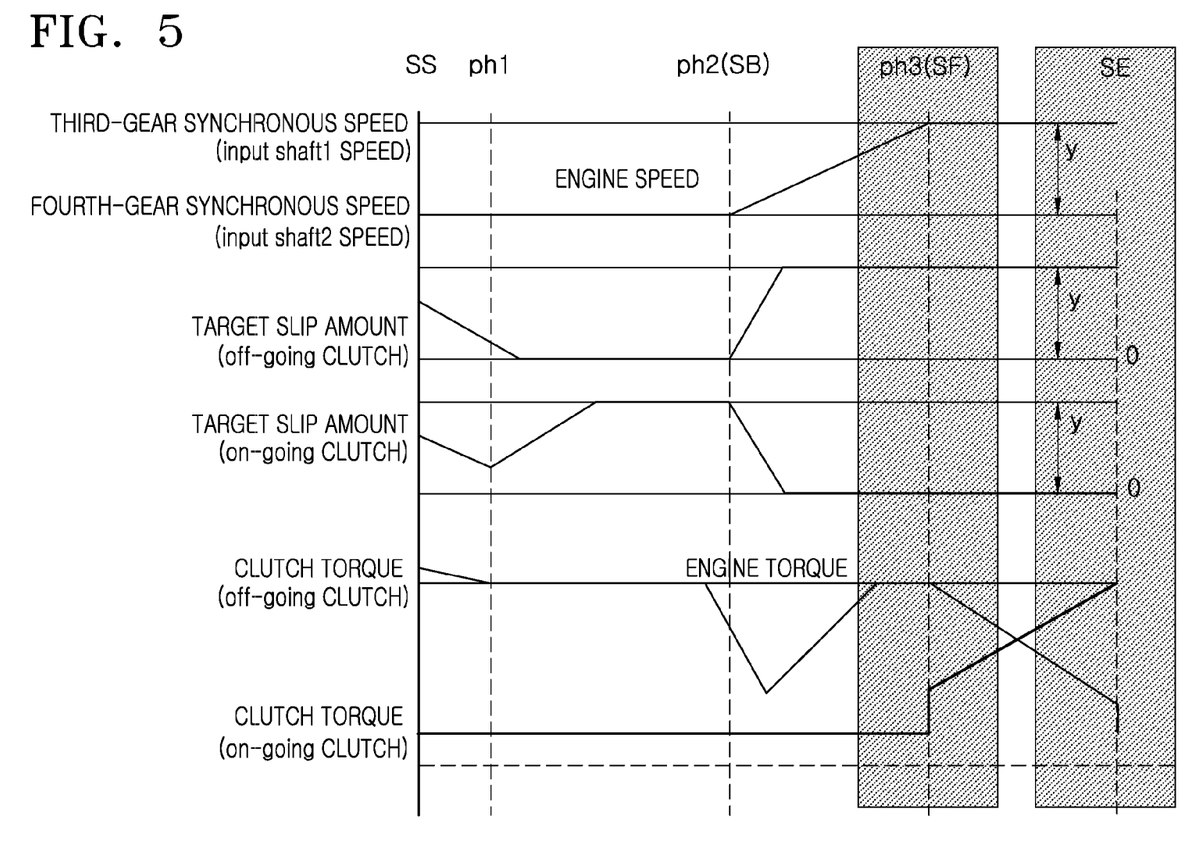
FIG. 5 is a diagram for describing the relation between target slip amount and clutch torque when the DCT is down-shifted in accordance with the embodiment of the present invention.

FIG. 5 is a diagram illustrating the relation between target slip amount and clutch torque when the DCT is down-shifted in accordance with the embodiment of the present invention.

As illustrated in FIG. 5, when a torque equal to or more than the engine torque is applied to the second clutch in case where the fourth gear is engaged in the DCT, the engine speed may become equal to the fourth gear speed. That is, speed synchronization may be achieved. Then, when a torque equal to or more than the engine torque is applied to the first clutch in case where the third gear is engaged, the engine speed may become equal to the third gear speed. That is, speed synchronization may be achieved.

When the DCT is down-shifted from the fourth gear to the third gear, the control unit 130 may disengage the fourth gear and engage the third gear. Then, the control unit 130 may adjust the engine speed to the third-gear synchronous speed from the fourth-gear synchronous speed, while gradually reducing the torque of the second clutch (off-going clutch) and gradually increasing the torque of the first clutch (on-going clutch).

Referring to FIG. 5, the relation between target slip amount and clutch torque during the down-shift operation of the DCT will be described in more detail.

Referring to FIG. 5, the engine speed may be adjusted to the fourth-gear synchronous speed at the step SS in which preparation for gear shifting is started. Then, the engine speed may be adjusted to the third-gear synchronous speed from the step ph3 in which the DCT is shifted to the third gear (actual gear shifting).

At this time, the relative speed between the third and fourth gears (that is, slip amount) may be set to y. That is, when the speed of the input shaft of the current gear (fourth gear) and the speed of the input shaft of the target gear (third gear) are measured, the relative speed y therebetween may be set to the slip amount. The slip amount may be changed depending on the respective gears, and the slip amount between the third and fourth stages may be set to 1,000 rpm.

At this time, the control unit 130 may adjust the target slip amount of the off-going clutch (second clutch) to zero immediately before the step ph2 in which gear shifting (actual gear shifting) is started (that is, the control unit 130 may adjust the speed of the second clutch to the fourth-gear synchronous speed in order to detect the speed of the engine which is being rotated at the fourth-gear synchronous speed). Then, the control unit 130 may gradually increase the target slip amount of the off-going clutch (second clutch) at the step ph2 in which actual gear shifting is started (that is, the control unit 130 may gradually reduce the off-going clutch torque and gradually release the coupling between the off-going clutch and the engine). On the other hand, the control unit 130 may gradually reduce the target slip amount of the on-going clutch (first clutch) (that is, the control unit 130 may gradually increase the on-going clutch torque and engage the on-going clutch to the engine).

In FIG. 5, the control patterns of the off-going clutch torque, the on-going clutch torque, and the engine torque at the respective steps SS, ph1, ph2, ph3, and SE correspond to control patterns during a general down-shift operation of the DCT. Thus, the detailed descriptions thereof are omitted herein.

In FIG. 5, the step ph2 indicates a step in which the engine speed starts to be changed to the target gear (the third gear), the step ph3 indicates a step in which torque transfer is started while the second clutch torque (off-going clutch torque) is reduced and the first clutch torque (on-going clutch torque) is increased, and the step SE indicates a step in which the torque transfer is completed.

Figure 6:
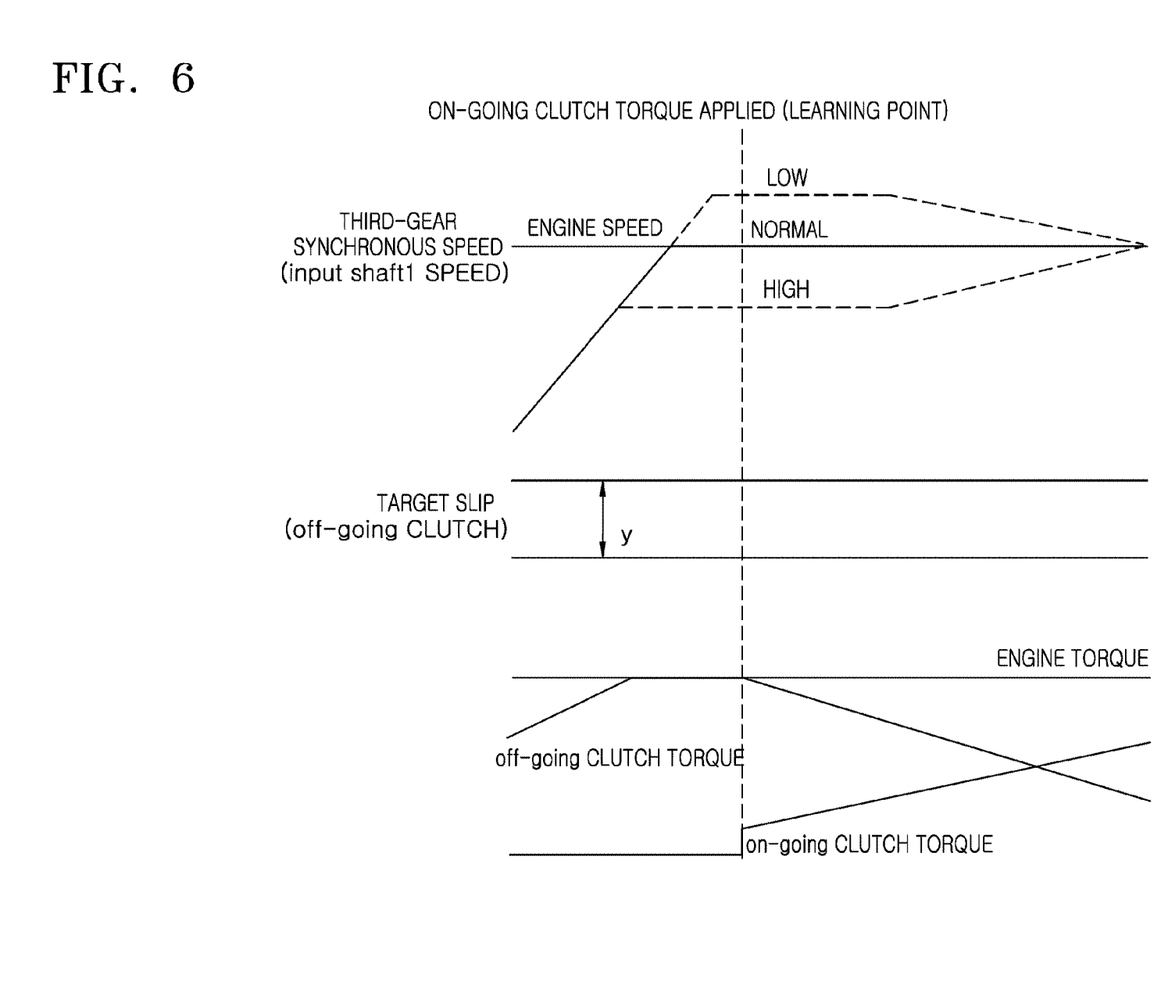
FIG. 6 is a diagram for describing the relation between target slip amount and clutch torque at the step ph3 in FIG. 5.
Figure 7:
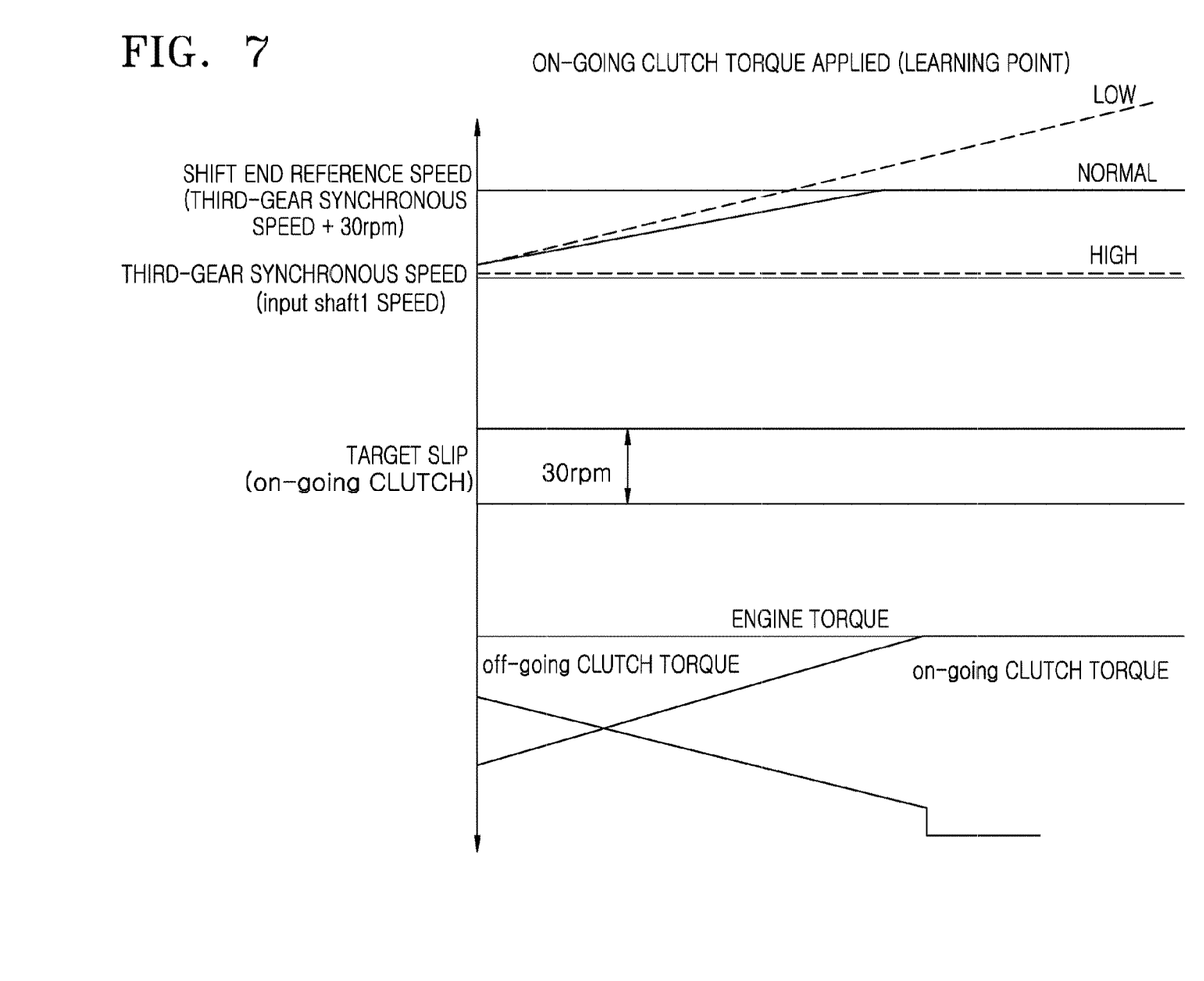
FIG. 7 is a diagram for describing the relation between target slip amount and clutch torque at a step SE (Shift End) in FIG. 5.

FIG. 6 is a diagram for describing the relation between target slip amount and clutch torque at the step ph3 in which torque transfer is started in FIG. 5, and FIG. 7 is a diagram for describing the relation between target slip amount and clutch torque at the step SE in FIG. 5.

Referring to FIG. 6, the control unit 130 may detect the relative speed y between the input shaft of the current gear (fourth gear) and the input shaft of the target gear (third gear) immediately before the torque transfer is started, or detect the relative speed y' between the input shaft of a support gear and the input shaft of the target gear (third gear) when the support gear exists, in the case of the down-shift operation.

Furthermore, when the engine speed becomes higher than the target-gear synchronous speed (the third-gear synchronous speed) immediately before the on-going clutch torque is applied, the control unit 130 may determine that the actual off-going clutch torque with respect to the engine torque is smaller than the target value (the target off-going clutch torque), and control the DCT to learn to increase the slip factor or friction coefficient. For example, when it is assumed that the reference slip factor is 1, the control unit 130 may learn to increase the reference slip factor to more than 1.

On the other hand, when the engine speed becomes lower than the target-gear synchronous speed (the third-gear synchronous speed) immediately before the on-going clutch torque is applied, the control unit 130 may determine that the actual off-going clutch torque with respect to the engine torque is larger than the target value (the target off-going clutch torque), and control the DCT to learn to reduce the slip factor or friction coefficient. For example, when it is assumed that the reference slip factor is 1, the control unit 130 may learn to reduce the reference slip factor to more than 1. At this time, the target slip amount of the off-going clutch may be set to a value corresponding to a speed difference y (for example, 1,000 rpm) between the third and fourth gears, because the actual gear shifting is not yet completed.

Referring to FIG. 7, when the slip amount becomes larger than the reference slip (the target slip of 30 rpm), that is, when the engine speed becomes higher than "third-gear synchronous speed+30 rpm" after the torque transfer is ended (that is, after the off-going clutch torque becomes zero at the step SE), the control unit 130 may determine that the on-going clutch torque is smaller than the target value (the target on-going clutch torque), and learn to increase the slip factor or friction coefficient. For example, when the reference slip factor is 1, the control unit 130 may learn to increase the reference slip factor to more than 1.

On the other hand, when the slip amount becomes smaller than the reference slip amount (the target slip amount of 30 rpm), that is, when the engine speed becomes lower than "third synchronous speed+30 rpm", the control unit 130 may determine that the on-going clutch torque is larger than the target value (the target on-going clutch torque), and learn to reduce the slip factor or friction coefficient. For example, when the reference slip factor is 1, the control unit 130 may learn to reduce the reference slip factor to less than 1.

At this time, the target slip amount of the on-going clutch may become about 30 rpm because the actual gear shifting (the change of the engine speed) is almost completed. However, the target slip amount is not limited to 30 rpm.

The slip factor learning method of a DCT in accordance with the embodiment of the present invention can apply an accurate clutch torque through a learning process for a slip factor during a gear shifting operation in which a predetermined amount of slip occurs. Thus, the slip factor learning method can prevent an excessive slip of the on-going clutch, and perform gear shifting without a strange feeling.

Figure 8:
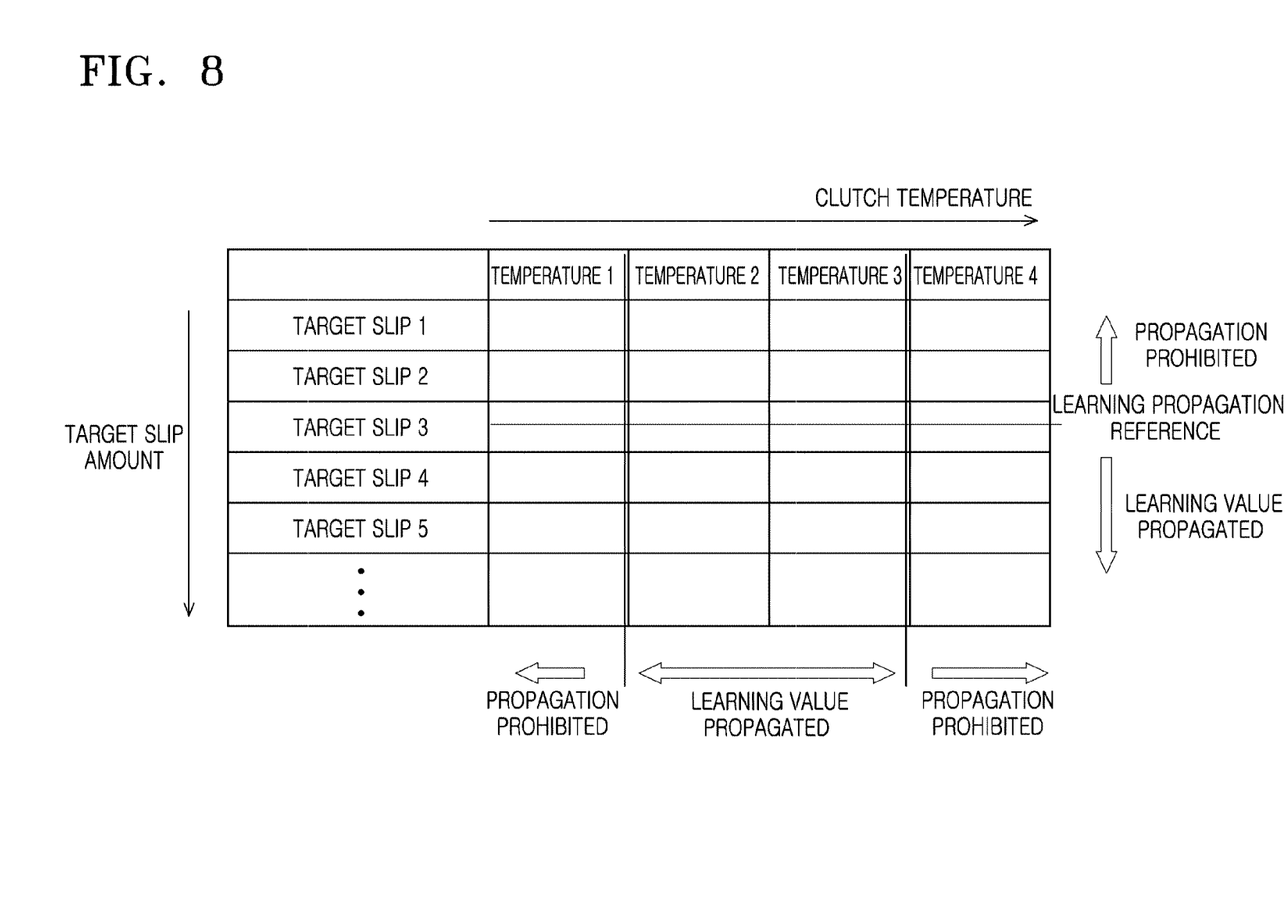
FIG. 8 is a diagram illustrating a memory map for describing a method for propagating a slip factor learning value of a DCT in accordance with an embodiment of the present invention.

FIG. 8 is a diagram illustrating a memory map for describing a method for propagating a slip factor learning value of a DCT in accordance with an embodiment of the present invention.

As illustrated in FIG. 8, the control unit 130 may store a learning value or slip factor based on conditions set in an internal memory (not illustrated), such as a target slip amount and a clutch temperature. When a learning value (slip factor) corresponding to any one condition is learned and stored, learning values of regions around the region in which the learning value is stored may be automatically adjusted according to the preset standard. In the preset embodiment, this is referred to as learning propagation. For example, a value learned in a propagation region can be multiplied by a predetermined coefficient (that is, propagation coefficient), and propagated to a region corresponding to the designated condition (temperature and slip amount). The propagation coefficient may be applied to be inversely proportional to a distance between the center value of the region (memory region) in which learning is actually performed and the center value of the region to which the learning value is propagated.

The learning propagation section may be previously set.

That is, only a learning value of a section corresponding to a specific condition can be propagated. The specific condition may indicate a section in which the clutch temperature for a target slip 3 corresponds to temperatures 2 and 3.

The memory region for storing the learning value or slip factor may be divided into the region in which the slip amount is equal to or less than a specific slip amount and the region in which the slip amount is more than the specific slip amount. Typically, the region in which the slip amount is equal to or less than the specific slip amount indicates a region in which the slip amount is 100 rpm, and is referred to as a micro-slip region. The region in which the slip amount is more than the reference slip amount may be divided into a plurality of regions according to temperature.

In accordance with the embodiment of the present invention, when torque transfer occurs between an off-going clutch and an on-going clutch during a gear shifting period of the DCT, gear shifting without a strange feeling may be performed through a learning process for a clutch slip factor.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A slip factor learning method of a dual clutch transmission (DCT), comprising:
   determining, by a control unit, whether the DCT is up-shifted or down-shifted;
   comparing, by the control unit, an engine speed to a shift start reference speed, and determining whether the engine speed enters an actual gear shifting period and comparing the engine speed to a shift end reference speed and determining whether actual gear shifting is completed, in response to the determined type of the gear shifting;
   comparing, by the control unit, a magnitude of an engine torque to a magnitude of a clutch torque at a point of time that the engine speed enters the actual gear shifting period and at a point of time that the actual gear shifting is completed;
   learning, by the control unit, a slip factor at the point of time that the engine speed enters the actual gear shifting period and at a point of time that the actual gear shifting is completed, based on the magnitude comparison result between the engine torque and the clutch torque; and
   controlling the DCT to perform gear-shifting with the learned slip factor.

2. The slip factor learning method of claim 1, wherein after the learning of the slip factor, the control unit multiplies the learned slip factor by a preset propagation coefficient, and propagates the multiplication result to a region which has a preset clutch temperature and a target slip amount, and
   the propagation coefficient is applied to be inversely proportional to a distance between a center value of a target slip amount of a region where learning is actually performed and a center value of a target slip amount of a region to which learning is to be propagated.

3. The slip factor learning method of claim 1, wherein when the DCT is up-shifted, the control unit increases an on-going clutch torque at a preset slope during a preset reference time from a point of time that the on-going clutch torque becomes equal to the engine torque after torque transfer is completed, and
   the control unit determines an actual on-going clutch torque to be smaller than a currently-inputted engine torque, when the engine speed does not become lower than the shift start reference speed even though the on-going clutch torque is applied during more than the preset reference time, and learns to increase the slip factor, and
   when the engine speed becomes lower than current-gear synchronous speed before the torque transfer is completed, the control unit determines the on-going clutch torque to be larger than the engine torque, and learns to reduce the slip factor.

4. The slip factor learning method of claim 3, wherein a point of time that the torque transfer is completed corresponds to a point of time that an off-going clutch torque becomes zero.

5. The slip factor learning method of claim 3, wherein the actual gear shifting period comprises a period in which the engine speed is changed to a target gear speed from a current gear speed.

6. The slip factor learning method of claim 3, wherein the shift start reference speed corresponds to (the current-gear synchronous speed−the target slip amount).

7. The slip factor learning method of claim 3, wherein when the actual gear shifting is completed after the engine speed enters the actual gear shifting period, the control unit releases an engine torque reduction request at a point of time that the actual gear shifting is completed, when a final engine speed becomes higher than the shift end reference speed after the engine torque reduction request is released, the control unit determines the actual on-going clutch torque to be smaller than a target on-going clutch torque, and learns to increase the slip factor, and when the final engine speed becomes higher than the shift end reference speed and coincides with the target-gear synchronous speed, the control unit determines the actual on-going clutch torque to be larger than the target on-going clutch torque, and learns to reduce the slip factor.

8. The slip factor learning method of claim 7, wherein the shift end reference speed corresponds to (the target-gear synchronous speed+the target slip amount).

9. The slip factor learning method of claim 1, wherein when the DCT is down-shifted and the engine speed becomes higher than a target-gear synchronous speed immediately before an on-going clutch torque is applied, the control unit determines an actual off-going clutch torque with respect to the engine torque to be smaller than a target off-going clutch torque, and learns to increase the slip factor, and when the engine speed becomes lower than the target-gear synchronous speed immediately before the on-going clutch torque is applied, the control unit determines that the actual off-going clutch torque with respect to the engine torque to be larger than the target off-going clutch torque, and learns to reduce the slip factor.

10. The slip factor learning method of claim 9, wherein when a slip amount becomes larger than a reference slip amount after torque transfer of the DCT is completed, the control unit determines an actual on-going clutch torque to be smaller than a target on-going clutch torque, and learns to increase the slip factor, and when the slip amount becomes smaller than the reference slip amount, the control unit determines the actual on-going clutch torque to be larger than the target on-going clutch torque, and learns to reduce the slip factor.

11. The slip factor learning method of claim 10, wherein in order to determine whether the slip amount becomes larger or smaller than the reference slip amount, the control unit determines whether the engine speed is larger or smaller than (current-gear synchronous speed+target slip).

* * * * *